(12) United States Patent
Tieckelmann et al.

(10) Patent No.: US 6,197,106 B1
(45) Date of Patent: Mar. 6, 2001

(54) FERROPHOSPHORUS ALLOYS AND THEIR USE IN CEMENT COMPOSITES

(76) Inventors: Robert H. Tieckelmann, 48 Annabelle Ave., Trenton, NJ (US) 08610; George M. Diken, 17 Arrowwood Dr., Hamilton Square, NJ (US) 08690

( * ) Notice: Subject to any disclaimer, the term of this patent is extended or adjusted under 35 U.S.C. 154(b) by 0 days.

(21) Appl. No.: 09/167,164

(22) Filed: Oct. 6, 1998

Related U.S. Application Data

(60) Provisional application No. 60/061,314, filed on Oct. 7, 1997, and provisional application No. 60/078,727, filed on Mar. 20, 1998.

(51) Int. Cl.⁷ .................................................. C22C 45/02
(52) U.S. Cl. .................. 106/644; 106/733; 106/766; 106/769; 148/403
(58) Field of Search .................. 148/304, 403; 106/644, 733, 766, 769

(56) References Cited

U.S. PATENT DOCUMENTS

| Re. 32,925 | 5/1989 | Chen et al. | 148/403 |
|---|---|---|---|
| 4,400,208 | 8/1983 | Ackermann | 420/428 |
| 5,518,518 | 5/1996 | Blum et al. | 75/10.15 |
| 5,547,487 | 8/1996 | Blum et al. | 75/10.15 |

FOREIGN PATENT DOCUMENTS

| 196 37 679 | 3/1998 | (DE) . | |
|---|---|---|---|
| 2710334 | 3/1995 | (FR) . | |
| 59-041450 | * 3/1984 | (JP) | 148/304 |
| 59-193248 | * 11/1984 | (JP) . | |
| 9612046 | 4/1996 | (WO) . | |
| 9838348 | 9/1998 | (WO) . | |

OTHER PUBLICATIONS

Babaei, Khossrow, et al, "Solutions to Concrete Bridge Deck Cracking" *Concrete International* Jul. 1997, pp. 34–37.

Mehta, P. Kumar "Durability–Critical Issues for the Future" *Concrete International*, Jul. 1997, pp. 27–33.

Boucheret, JM, "Wet Sprayed Mortars Reinforced with Flexible Metallic Fibres for Renovation," *SCA/SCI International Conference*, Edinburgh, Oct. 11 Sep., 1996.

Granju, et al., "Serviceability of Fiber Reinforced Thin Overlays," 1995 ConChen Conference, *Verlagfur Chemische Industrie*, Augsburg (1995).

\* cited by examiner

*Primary Examiner*—George Wyszomierski
(74) *Attorney, Agent, or Firm*—Thompson Coburn LLP; Paul A. Lesko

(57) ABSTRACT

Amorphous ferrophosphorus alloys (Formula II) are useful as shrinkage control agents in cement composites, and new amorphous ferrophosphorus alloys particularly useful for this purpose are disclosed having the formula:

$$Fe_a Cr_b M_c P_d C_e Si_f \qquad \text{(Formula I)}$$

wherein M is a metal selected from the group consisting of $V_g$, $Ni_h$, $Mn_i$ and mixtures thereof, and a is about 66–76, b is about 1–10, c is about 2–7, d about 12–20, e about 1–6, f is less than about 2, g is about 1–5, h is less than about 2 and i is less than about 2, atomic percent.

37 Claims, No Drawings

FERROPHOSPHORUS ALLOYS AND THEIR USE IN CEMENT COMPOSITES

This application claims the benefit of priority under 35 U.S.C. §119 (e) from U.S. provisional patent application Ser. No. 60/061,314, filed Oct. 7, 1997 and U.S. provisional patent application Ser. No. 60/078,727, filed Mar. 20, 1998.

BACKGROUND

The invention is in the field of ferrophosphorus metal alloys and their use to control the development of cracks that form during the early phases of cure in cement composites. More particularly, this invention relates to specific amorphous ferrophosphorus-based alloys and the use of the alloys in wire, ribbon, and fiber forms, to control, reduce, eliminate, or retard the growth of cracks in cement composites.

Cement composites are typically cements, mortars, and concretes. Minimally, cement composites are non-homogeneous mixtures of cement, sand, aggregates and water. Cement composites may also include a number of additives or admixtures that impart important chemical and physical properties to the composites such as improved rheology, impact strength, flexural strength, and resistance to permeability. The additives and admixtures include water reducing admixtures, metal and nonmetal fibers, polymers, silica fume, and the like.

After the cement composite is poured or placed in its final form, the composite undergoes a relatively rapid loss of water over of period of 24 to 48 hours. The loss of water is primarily due to evaporation from the exposed surfaces of the cement composite. The loss of water requires waiter migration within the composite, this process is a non-uniform or non-isotropic process. This factor coupled with the non-homogeneous nature of the cement composite contributes to the formation of non-equilibrium stresses. The stresses lead to the formation of cracks that are frequently referred to as plastic shrinkage cracks and plastic settlement cracks.

Several authors have recently attributed the formation of cracks during the early phases of cement composite curing to the majority of failures in bridge decks as well as the lack of overall durability in modern concrete structures. Articles by Khossrow Babaei and Amir M. Fouladgar ("Solutions to Concrete Bridge Deck Cracking", *Concrete International*, July 1997, pp 34–37) and P. Kumar Mehta ("Durability—Critical Issues for the Future", *Concrete International*, July 1997, pp 27–33) are examples of an expressed need for solutions to the problem of plastic shrinkage cracking and plastic settlement cracking. For the purpose of this invention, "shrinkage cracks" refers to plastic shrinkage cracks or plastic settlement cracks which occur in cement composites during the first 24 to 48 hours of cure of the cement composites, and control of shrinkage cracks refers to the elimination, reduction, retardation in growth or ability to prevent shrinkage cracks.

Once a crack has formed in a cement composite, the crack serves as a point of entry for water, road salts, and other environmental influences that can damage the composite in both an acute and chronic manner. Water intrusion and cycling of temperatures below and above the freezing point of water results in a phenomena commonly referred to as freeze-thaw damage. Road salts can penetrate cracks and corrode reinforcing steel or bars (rebar) imbedded in the cement composite. Each process serves to gradually increase the size of the original cracks and permit intrusion and penetration of increased amounts of water and salt into the composite. Ultimately, the cement composite is weakened and has a reduced capacity to withstand the stresses the composite was designed to bear. The weakened composite may require early repair, partial or full replacement, or it may fail catastrophically.

Fibers are added to cement composites to improve durability. Steel fibers (which are crystalline) are added to improve the flexural strength durability of the cement composite. Synthetic fibers, sucht as polypropylene and nylon, are added to improve the control of cracks that form during the curing of the cement composite. Steel fibers are sometimes added to improve the control of cracks that form during curing, but the addition levels are so large (10 to 100 lb. of fiber per yd$^3$ of composite) that the rheology of the composite is impaired. The impairment of rheology is overcome by the addition of admixtures, namely surfactants, such as naphthalenic surfactants. If the impairment of rheology is not overcome, the cement composite is stiff and does not pour well. Ultimately, the cement composite will fail due to the inability to properly place and finish the composite.

Thus, it would be desirable to produce a steel fiber that controls the formation of cracks during cement composite curing; at addition levels that are less than about 10, preferably less than about 5 lbs per cubic yard of cement composite. Or, conversely, it would also be desirable to produce a steel fiber that controls the formation of cracks during cement composite curing at addition levels similar to the addition levels that are used for current commercially available crystalline steel fibers without the requirement for an admixture to overcome the deleterious affect on rheology.

DESCRIPTION OF THE INVENTION

The present invention involves new ferrophosphorus alloys, and the invention also recognizes the use of ferrophosphorus alloys to control shrinkage cracks in cement composites. The new ferrophosphorus alloys have the formula:

$$Fe_a Cr_b M_c P_d C_e Si_f \qquad \text{(Formula I)}$$

where the elements are described in terms of atomic percent, based on the IUPAC standard using carbon (12.0) which standard is used throughout this specification, where M is a metal selected from the group consisting of $V_g$, $Ni_h$, $Mn_i$ and mixtures thereof, where a is about 66–76, b is about 1–10, c is about 2–7, d is about 12–20, e is about 1–6, f is less than about 2, g is about 1–5, h is less than about 2 and i is less than about 2, and wherein the ratio of metals to non-metals is sufficient to allow for the formation of a stable amorphous ferrophosphorus alloy. As is known by those in the art, the amount of metals, namely, Fe, Cr and M, must be sufficient to allow for the formation of an amorphous metal at the cooling rate used. For example, when the cooling rate of the alloy is about 1×10$^6$ degrees C. per second, then a+b+c will be at least about 77 atomic percent and d+e+f will be about equal to or less than about 23 atomic percent. The faster the cooling rate, generally, the lower the ratio of metals to non-metals, e.g., P, C, and Si that will yield an amorphous structure. (The same considerations apply for the alloys of Formula II, below.) In one embodiment of the invention, the alloy is formulated and prepared (cast) in a manner which creates a non-uniform gross morphology (defined below) in the resultant amorphous ferrophosphorus metal alloy. In another embodiment, preferably a is about 68–74, b is about 2–8, c is about 2–4, d is about 13–20, e is about 1–6, f is less than about 2, g is about 1–3, h is less than about 1 and i is less than 1. The phosphorus to carbon ratio (P:C) is greater than 1 and the chromium to vanadium ratio is greater than 1, thus adding to the corrosion resistance of the ferrophosphorus alloy. Preferably, the P to C ratio is greater than 1.2:1, the iron to chromium ratio (Fe:Cr) is greater than 12:1 and the chromium to vanadium ratio (Cr:V) is less than 7:1. Examples of such alloys include: $Fe_{74}Cr_2V_2Ni_{0.5}P_{19}C_1Si_{0.5}$; $Fe_{72}Cr_2V_2Ni_{0.5}P_{17}C_5Si_1$; preferably $Fe_{68}Cr_5V_2Ni_{0.5}Mn_{0.5}P_{16}C_{5.5}Si_1$; and more preferably $Fe_{71}Cr_6V_2Ni_{0.5}Mn_{0.5}P_{18}C_1Si_1$; and $Fe_{71}Cr_5V_2Ni_{0.5}Mn_{0.5}P_{15}C_5Si_1$, the formulas are in atomic percentages. More preferred is an alloy having a P:C ratio of 3:1 or greater. Surprisingly, fiber, wire, or ribbon produced from this alloy, Formula I, with an addition level of from 1 to 40 lb, preferably less than 20 lb of fiber per $yd^3$ of composite, controlled the undesirable plastic shrinkage cracking and plastic settlement cracking that occurs during the curing of cement composites. Admixtures, for example, surfactants, to improve rheology are not required even at 100 lb of fiber per $yd^3$ of composite. This broad addition level spans the range of needs outlined above.

Another embodiment of the invention lies in the recognition that amorphous ferrophosphorus alloys can be used to control shrinkage cracks of cement composites. The alloys are:

$$Fe_aCr_bM_cP_dC_eSi_f \qquad \text{(Formula II)}$$

where M is a metal selected from the group consisting of $V_g$, $Ni_h$, $Mn_i$ and mixtures thereof, a is about 61–87, b is about 1–10, c is about 1–5, d is about 4–20, e is about 1–16, f is less than about 3.5, g is less than about 1 to about 5, h is less than about 1 and i is less than about 1, atomic percent; and wherein the ratio of metals to non-metals is sufficient to allow for the formation of a stable amorphous ferrophosphorus alloy. In one embodiment of this application, the alloy is formulated and prepared in a manner which creates a non-uniform gross morphology (defined below) in the resultant amorphous ferrophosphorus alloy. Preferred ferrophosphorus alloys used for shrinkage crack control are those of Formula I, and more preferred ferrophosphorus alloys have a P:C ratio of greater than 1 and the chromium is present Cr:V ratio is greater than 1, thus adding to the corrosion resistance of the ferrophosphorus alloy. Most preferred alloys have a Fe to Cr ratio that is greater than 12:1 and a Cr to V ratio that is less than 7:1. When used to control shrinkage cracks in cement composites, the fiber has a length of about 15–55 millimeters and a pound of the alloy contains at least about 25,000 fibers. Examples of such alloys include $Fe_{73}Cr_6V_{0.1}Ni_{0.1}Mn_{0.2}P_{11}C_9Si_1$; $Fe_{72}Cr_6V_{0.2}Ni_{0.1}Mn_{0.2}P_{11}C_{10}Si_1$; $Fe_{72}Cr_6V_{0.7}Ni_{0.3}Mn_{0.2}P_{10}C_9Si_1$; and $Fe_{72}Cr_6V_{0.7}Ni_{0.3}Mn_{0.2}P_{10}C_9Si_1$ as well as the alloys of Formula I. Even more preferred is a P:C ratio of 3:1 or greater.

The amorphous metal fibers of Formula I tend to be less uniform in gross morphology than other amorphous steel fibers or, for that matter, crystalline steel fibers. Generally, when amorphous metal fibers were prepared and cast, it was with the goal of achieving a uniform appearance in the resulting ribbons, fibers, wires, etc., for example, smooth surfaces, uniform thickness (no or very few holes) and substantially uniform, smooth edges when viewed by the eye. However, in one embodiment of this invention, amorphous ferrophosphorus metals having a non-uniform gross morphology is desired. By "non-uniform gross morphology" is meant rough edges, projections, holes and discontinuities in the amorphous metal. The non-uniform gross morphology is readily apparent to the eye even though the degree and clarity of the non-uniform morphology may be better seen (clarified) by magnification. Such a characteristic, until this invention for shrink crackage control of cementitious material, was considered undesirable.

The ability of these fibers to control shrinkage cracks is believed influenced by the sheer abundance of edges, holes, and discontinuities as they effect the early phases of cure of a cementitious material. As the cementitious material cures through its "green phase" (initial 24 hours or less of cure), there is a tendency for the material to shrink in a non-equilibrium (non-uniform) manner. Where the material exhibits a predominant amount of non-equilibrium behavior (shrinkage), stress builds in the material. When the stresses exceed the elastic limit of the cementitious material, cracks appear and begin to propagate through the material. However, if a fiber or a portion of a fiber interrupts the propagation of the crack, particularly in the early phases of cementitious material curing, the crack will not grow. Thus, when crack growth is interrupted the cracks remain numerous and small (invisible to the eye) and integrity of the material is not compromised.

It is important to note that the curing cementitious material is "soft". That is, its strength is a small fraction of its fully cured strength. Therefore, a fiber with great tensile strength is not necessary to interrupt crack growth. In fact, it is theorized that thin fibers with numerous projections or discontinuities would be more effective in anchoring areas of the cementitious material as the material experiences non-equilibrium stresses. Or, from a slightly different perspective, a smooth fiber would not, theoretically, anchor well and might slip or adjust too easily as the stresses build. In this case, crack propagation would not be interrupted as efficiently as with the less uniform fiber.

On testing the compositions of Formula I it was unexpectedly found that a non-uniform gross morphology probably contributed to the fiber's ability to control the formation of plastic shrinkage cracks. Additionally, these fibers were long, thin, and narrow. That means the fibers were also much more numerous for a given weight of fiber than other fibers used in cementitious applications. Thus it is the combination of non-uniform gross morphology and number density (the number of fibers per weight unit of fiber) which is believed to impact the performance of a fiber type in the control of shrinkage cracking.

The fiber, wire, and ribbons of the amorphous ferrophosphorus alloys of this invention can be produced from any source of ferrophosphorus metal including a crystalline ferrophosphorus by-product of elemental phosphorus production by thermal reduction of a phosphate ore. One such by-product is sold by FMC Corporation under the trademark Ferrophos® iron phosphide. A typical composition produced from a Western United States phosphate ore is: Fe (56–60 wt. %), P (24.5–27.8 wt. %), V (3.9–5.5 wt. %), Cr (3.6–6.0 wt. %) and Si (0.5–4.5 wt. %), and $Fe_{47}Cr_4V_5(Ni,Ti,Cu,Mn,Ca,Na)_3P_{39}C_{0.1}Si_1(S,O)_1$ (atomic percentages) where the Fe:Cr ratio is 12:1 and where the P:C ratio is 390:1. Other metals are also found in the iron phosphide by-products, usually in amounts no greater than 1% (atomic percent), such as copper and molybdenum.

These amorphous ferrophosphorus alloys, Formulas I and II, can be made by techniques known in the art. The production of amorphous metal alloys is well known in the art as exemplified by U.S. Pat. No. 3,856,513 and its Reissue 32,925 to Chen et al., U.S. Pat. Nos. 5,518,518 and 5,547,487 to Blum et al. The patents are incorporated herein by reference. The patents teach the production of a ferrophosphorus alloy from the phosphorus-bearing shale of the American West and the techniques described therein can be used with other phosphate ores.

These and other known amorphous metals are produced by very rapidly cooling a liquid metal alloy at a speed on the order of $1\times10^6$ degrees Centigrade per second in order to maintain the non-crystalline structure of the liquid alloy when it solidifies. In effect, the molten liquid is quenched to a temperature below the vitrification temperature to form a supercooled glass having the properties of a frozen liquid that preserves the amorphous nature of the molten alloy without converting it into a crystalline body.

One technique for carrying out such rapid cooling is to pour a continuous stream of molten alloy onto a moving cooled surface, normally metal, such as a rotating metal wheel, roller(s) or belt. The cooled metal surface has a high heat transfer rate and can quench the molten metal alloy into an amorphous solid state. To obtain this high cooling rate the molten metal must be distributed on the cooled surface in a very thin film that permits the entire film to be quenched. In most instances, the amorphous metal is produced as a very thin ribbon a few mils thick and from about 0.001 millimeters (mm) to 25 mm in width. This same technique can be used to produce thin wire strands of the amorphous metal alloys. The casting (rapid cooling of) ferrophosphorus amorphous alloys is well known by those in the art including techniques for creating alloys having uniform and non-uniform gross morphologies. In one embodiment of the invention, casting to create non-uniform gross morphology of alloys of Formulas I and II is preferred.

The principal elements added by the iron phosphide by-product are iron and phosphorus. However, the by-product may also add chromium and vanadium to the alloy and these elements tend to increase the strength and corrosion resistance of the alloy and further to raise the recrystallization temperature of such iron based amorphous metal alloys. This facilitates heat treating such alloys in subsequent treating steps. These elements also lower the Curie temperature, or the temperature at which a material loses ferromagnetizism. Non-magnetic items normally require low Curie temperatures.

In all events, the resulting amorphous alloy formed in the present invention has metals and values that may be expressed by Formulas I and II above. In the above formulas, there can also be added as additional polyvalent metalloid, elements such boron, germanium, etc. either in addition to or as a partial substitute for phosphorus. Other elements employed in such amorphous alloys may also be added such as aluminum, tin, antimony, germanium, indium, beryllium, arsenic and mixtures thereof.

The ferrophosphorus by-product of the elemental phosphate production is combined with metals and non-metals so that the proportions produce low melting alloys or eutectics. In general, it is preferred to mix the ferrophos by-product and iron so that the proportions are about or at eutectic mixture. Such a mixture, for example, is formed when the iron constitutes 71% of the mixture, phosphorus 15%, vanadium 2%, nickel 0.5%, manganese 0.5%, chromium 5%, carbon 5% and silicon 1%, all percents expressed as atomic percent. In general, the lower the melting temperatures of such eutectic mixtures relative to the melting point of the principal elements such as iron and phosphorus, the more readily the molten mixture can be cooled into an amorphous alloy. This is important because the lower the eutectic temperature the easier it is to cool, that is, quench the alloy into an amorphous mass, and this allows the alloy to be cooled in a wider range of thicknesses which is advantageous from a product viewpoint. Normally, ribbons have to be very thin because of the necessity to quench the entire mass in the ribbon at very high cooling rates. Alternatively, the low-melting alloys can be made from other sources, for example, from the elements or from commercially available laboratory and analytical grade chemicals. The alloys are subsequently converted to fibers, wires, or ribbons by processes that rapidly quench, rapidly solidify, or supercool the molten alloy. The temperature is decreased at a rate of about $1\times10^6$ degrees centigrade per second. The result is an amorphous alloy with unique properties.

Amorphous character yields properties that are distinct from the properties of a crystalline system of similar composition. Amorphous alloys in ribbon, wire, and fiber form are flexible (not stiff), resistant to corrosion, and can be readily produced in large aspect ratios (width to thickness greater than 100:1), and with large specific surface areas. The amorphous ferrophosphorus fibers, wires, and ribbons of this invention can be finely cast such that a pound of fiber will contain in excess of 25,000 fibers. The fiber exhibits sufficient amorphous character in terms of flexibility and does not impair the rheology of the cement composite. In addition, the fibers of Formula I do not impair several other critical aspects of curing and cured cement composites including compressive strength, flexural strength, and setting time. The amorphous fibers of this invention exhibit superior resistance to corrosion when compared to crystalline steel fibers.

Ordinary Portland cement (OPC) is a typical cement for studying the effects of admixtures on the physical properties of the cured cement composite. Addition levels of each admixture to OPC are usually expressed in pounds of fiber per cubic yard of cement composite (lb fiber/$yd^3$ cement composite). The fiber of this invention begins to control shrinkage cracking when applied at less than 2.5 lb fiber/$yd^3$ cement composite and continues to control or eliminate shrinkage cracking at 100 lb fiber/$yd^3$ cement composite. Generally, such control extends from 0.25 to 100 lb fiber/$yd^3$ cement composite, preferably from 0.25 to 20 lb fiber/$yd^3$ cement composite is used because in most cases shrinkage cracking is eliminated at 20 lb fiber/$yd^3$ cement composite, more preferably less than about 10 lb fiber/$yd^3$ and most preferably from about 0.5–5 lb fiber/$yd^3$.

The ferrophosphorus alloys used to control shrinkage cracks in cement composites will generally have a length of about 15–55 millimeters (mm), preferably about 25–55 mm and more preferably about 30–55 mm. Generally, the longer the fiber the better the fiber controls (reduces) the formation of shrinkage cracking in cement composites. For this use, a pound of the fibers will generally contain in excess of 25,000 fibers and as high of a number of fibers as is functionally possible. Preferably a pound of the fibers will contain in excess of 25,000 fibers, more preferably in excess of 75,000 fibers and most preferably in excess of 100,000 fibers. The number of fibers per pound is dependent upon the length of the fiber, wire, or ribbon of amorphous ferrophosphorus alloy. The shorter the fiber, generally the more fibers per pound. (The number of fibers per pound is determined commonly by counting out 100 fibers, weighing them and then extrapolating to obtain the number per pound.) For a constant number of fibers, generally a longer fiber (for example, 55 mm) will give better shrinkage control than a shorter fiber (for example, 36 mm), which gives better shrinkage crack control than an even shorter, 18 mm, fiber. It is preferred that there be at least 75,000 fibers per pound wherein the fibers have a length of at least 25 mm.

Additionally, the amorphous ferrophosphorus fibers, when used to control shrinkage cracking, will have preferably a width and thickness which is generally less than that of known ferrophosphorus alloys used to enhance the durability of cement composites. Generally, the shorter the width and the thinner the thickness, the better for controlling shrinkage cracks, although length and numbers of fibers per pound are believed to have a greater effect. Generally, a width of less than about 1.6 mm and preferably from about 0.5–1.25 mm and a thickness of less than about 40 $\mu$m and preferably from about 10–30 $\mu$m are used. The ratio of width to thickness will range generally from 60:1 to 30:1 and preferably from about 40:1.

The control of shrinkage cracking will apply to any concrete, mortar, cement composite as well as any OPC-based composite including polymer-reinforced or polymer-containing concretes, mortars, or cements and any form of the concrete, mortar or cement whether poured, cast-in-place, etc. Common compositions of ordinary Portland cement (OPC) comprise: lime (CaO) 60–67, silica ($SiO_2$) 17–25, alumina ($Al_2O_3$) 3–8, ferric oxide ($Fe_2O_3$) 0.5–0.6, magnesium oxide (MgO) 0.5–4.0, alkalis (such as $Na_2O$) 0.3–1.2 and sulfur trioxide ($SO_3$) 2.0–3.5, all weight percent. The fibers of this invention may be used with other crystalline or amorphous metal fibers, synthetic fibers, or natural fibers, polymers, reinforcing bars and other available primary, secondary and tertiary forms of reinforcing material.

The concrete admixtures can also include typical amendments used in the field today, such as superplasticizers, pozzolans, superpozzolans, silica fume, specialty sands, artificial aggregates, epoxy-coated or corrosion-resistant steels, corrosion inhibitors, and rheology modifiers and the like, the use of which is known by those in the art.

The fibers of this invention are particularly useful when using cement rich systems that typically would be expected to shrink and produce cracks. Such cement rich systems include those high strength concretes that typically contain from 675 to 840 lb cement/$yd^3$ cement composite and have water to cement ratios of about 0.25 to 0.35.

The cement composite produced with the fibers of this invention is suitable for foundations, slabs, beams, walls, sewer and water pipes and conduits, bridges, highways, runways, tunnel floors, flooring systems such as hockey rinks and other structures that require maximum control of the cracks that form during curing.

EXAMPLES

Example 1

In a graphite or clay-graphite crucible an appropriate combination of Ferrophos® iron phosphide having a typical composition of $Fe_{47}Cr_4V_5(Ni,Ti,Cu,Mn,Ca,Na)_3P_{39}C_{0.1}Si_1$ $(S,O)_1$ (atomic percentages) where the Fe:Cr ratio was 12:1 and where the P:C ratio was 390:1, mild steel (Fe), ferrochromium (FeCr), ferrosilicon (FeSi), and graphite (C) were heated to about 2200° F. The steel formed a eutectic with the iron phosphide by-product at the interfaces between the steel and the by-product thus facilitating the formation of molten alloy at temperatures below the melting point of steel (~2800° F.). The addition schedules for the five alloys are summarized in Table 1. All amounts are in pounds (lb.). The iron phosphide is a byproduct of the production of elemental phosphorus in a reduction furnace. Mild steel is low carbon steel (typically less than 1% carbon). Higher carbon steels were used for alloys 2, 4, and 5 and the amount of graphite is lessened. Ferrochrome was 30:70 (Fe:Cr). The molten alloys were then cast through a filtering media to capture insoluble impurities and slag. The molten alloys then passed through an orifice to the surface of a wheel which was cooled internally. The crucible, filter media, and orifice were of graphite or clay-graphite composition. The fiber, ribbon, or wire samples were cast from the wheel surface, collected, and analyzed to confirm elemental composition. The cooling rate was about $1 \times 10^6$ degrees C./second to ensure formation of a glass-like or amorphous structure. Adjustments in wheel speed (rpm), flow of cooling water or coolant to casting wheel, orifice size, etc. affects the cooling rate and thus the quality of the fiber, ribbon, or wire cast in the process. The fiber, ribbon, or wire samples were collected for use in cement composites (Examples 2–4 below).

TABLE 1

| Alloy | FeP By-product | Mild Steel | Graphite | Ferrochrome | Silicon |
|---|---|---|---|---|---|
| 1 | 100 | 130 | 0 | 0 | 0 |
| 2 | 100 | 150 | 3.5 | 0 | 0 |
| 3 | 100 | 125 | 0 | 14 | 0 |
| 4 | 100 | 146 | 3.5 | 14 | 0 |
| 5 | 100 | 170 | 3.5 | 14 | 1 |

The amorphous ferrophosphorus alloys produced are shown in Table 1a:

TABLE 1a

| Alloy | Additions to By-product | Formula (atomic %) | Fe:Cr | P:C |
|---|---|---|---|---|
| 1 | Steel | $Fe_{74}Cr_2V_2Ni_{0.5}P_{19}C_1Si_{0.5}$ | 37:1 | 19:1 |
| 2 | Steel, C | $Fe_{72}Cr_2V_2Ni_{0.5}P_{17}C_5Si_1$ | 36:1 | 3:1 |
| 3 | Steel, FeCr | $Fe_{71}Cr_6V_2Ni_{0.5}Mn_{0.5}P_{18}C_1Si_1$ | 12:1 | 18:1 |
| 4 | Steel, FeCr, FeSi, C | $Fe_{68}Cr_5V_2Ni_{0.5}Mn_{0.5}P_{16}C_{5.5}Si_1$ | 14:1 | 3:1 |
| 5 | Steel, FeCr, FeSi, C | $Fe_{71}Cr_5V_2Ni_{0.5}Mn_{0.5}P_{15}C_5Si_1$ | 14:1 | 3:1 |

Typical dimensions of the alloys 1–5; are given in Table 2.

TABLE 2

| Fiber | Length mm (in) | Width mm (in) | Thickness mm(in) | Fiber per lb |
|---|---|---|---|---|
| Alloy 1 | 36 (1.4) | 1.3 (0.051) | 0.025 (0.0010) | 98,500 |
| Alloy 2 | 36 (1.4) | 1.4 (0.055) | 0.028 (0.0011) | 92,500 |
| Alloy 3 | 36 (1.4) | 1.4 (0.055) | 0.025 (0.0010) | 78,500 |
| Alloy 4 | 36 (1.4) | 1.3 (0.051) | 0.024 (0.0010) | 78,700 |
| Alloy 5 | 36 (1.4) | 1.2 (0.047) | 0.025 (0.0010) | 79,000 |

Example 2

Plastic Shrinkage Cracking Control During Curing

The data of Tables 3–7 and 18–21 represent the results from a plastic shrinkage cracking test of Alloys 1 and 3–5 in a mortar. The fiber dimensions were approximately 1.4"× 0.06"×0.001" (35.5 mm×1.54 mm×0.0254 mm). The data of Tables 8–17 and 22–25 represent the results from a plastic shrinkage cracking test of Alloys 3–5 in a concrete. The fiber dimensions of Tables 8–11 were approximately 1.4"×0.06"× 0.001" (35.6 mm×1.54mm×0.0254 mm) and the fiber dimensions of Tables 12–17 were approximately 0.7"× 0.06"×0.001" (17.8 mm×1.54 mm×0.0254 mm).

The method was developed by Paul Kraai and is presented in detail in "A proposed test to determine the cracking potential due to drying shrinkage of concrete", P. P. Kraai, Concrete Construction, September, 1995, pp 775–778. The method, as is known in the art, has three important features.

First, the mix design has an abundance of cement and water above the amounts generally used in concrete mix designs. Large aggregates are not present in the mix design. The excess of cement and water will induce cracking due to shrinkage. Second is the form that holds the mix design, the form creates a test panel 2'×3'×0.75" for mortar and 2'×3'×2" for concrete. The shallow panel has a large exposed surface area to facilitate loss of water by evaporation. The form has wire mesh at the edges and the bottom is covered with polyethylene. The wire mesh is 0.5"×1" mesh hardware cloth which restrains the edges of the test panel from movement; a direct cause of shrinkage cracking. The polyethylene allows water migration in one direction and also means the bottom of the test panel is unrestrained or not bound to the form. Last are the external conditions. Each test panel is exposed to movement of air (wind) from a fan that provides 10–12 mph air velocity.

The mix design for the mortar tests used a cement to aggregate ratio of 1:1.5 by weight, and a water to cement ratio of 0.5 by weight. For each panel, 0.014 yd$^3$ mortar was required. Therefore, for each panel 40 lb cement, 60 lb sand (aggregate), and 20 lb water were mixed. All ingredients were mixed at about 17–25° C. The cement and sand were charged to a static mixer and the water added to an active mixer. After mixing for 5 minutes, the mortar was poured to the panel form. This mix constituted the control.

The mix design for the concrete tests used a cement to sand to aggregate ratio of 1:1.2:1.2 by weight, and a water to cement ratio of 0.5 by weight. For each panel, 0.037 yd$^3$ concrete was required. Therefore, for each panel 50 lb cement, 60 lb sand, 60 lb ⅜ inch aggregate, and 25 lb water were mixed. All ingredients were mixed at about 17–25° C. The cement, aggregate and sand were charged to a static mixer and the water added to an active mixer. After mixing for 5 minutes, the concrete was poured to the panel form. This mix constituted the control.

When a fiber sample was evaluated, 100% of the fiber was added to the cement and sand (or cement, sand and aggregate) prior to the addition of water. The mixture was mixed for 5 minutes after all the fibers were coated.

After pouring to the panel form, the mix was screeded and troweled with a 40 inch piece of 1 inch angle iron. The angle iron was polished on one or more edges to afford a smooth finish to the panel. Fans were then set to accelerate the loss of water for 5 hours. Initial cracking occurred in the control in the first 1 hour. Evaluation and measurement of the cracks were done after 24 hours.

Lengths and average width were measured and recorded for each test panel. In Table 3 below: large, medium, small, and hairline are the number of 3, 2, 1 and 0.5 mm cracks, respectively. The cracks developed in a mortar, which contained Alloy 1, after 24 hours of curing or drying. Weighted value is the sum of the product's average width times length of each crack type. The control becomes 100% and subsequent samples were compared to the control in terms of their ability to control cracking that occurs as the concrete shrinks (Percent of Control). The 5 lb Alloy 1 fiber/yd$^3$ mortar exhibited 58% crack reduction.

TABLE 3

Alloy 1

| Fiber (lb/yd$^3$)* | Large | Medium | Small | Hairline | Weighted Value | Percent of Control |
|---|---|---|---|---|---|---|
| 0 (Control) | 2 | 6 | 34 | 20 | 62 | 100 |
| 5 | — | — | 15 | 22 | 26 | 42 |
| 10 | — | — | — | 20 | 10 | 16 |
| 25 | — | — | — | — | 0 | 0 |
| 50 | — | — | — | — | 0 | 0 |

*lb/yd$^3$ = lb fiber/yd$^3$ mortar

TABLE 4

Alloy 3

| Fiber (lb/yd$^3$)* | Large | Medium | Small | Hairline | Weighted Value | Percent of Control |
|---|---|---|---|---|---|---|
| 0 (Control) | 0 | 9 | 12 | 60 | 60 | 100 |
| 2.5 | 0 | 0 | 4 | 10 | 9 | 15 |
| 5 | 0 | 0 | 0 | 9 | 4.5 | 8 |
| 7.5 | 0 | 0 | 0 | 3 | 1.5 | 3 |
| 10 | 0 | 0 | 0 | 0 | 0 | 0 |

*lb/yd$^3$ = lb fiber/yd$^3$ mortar

TABLE 5

Alloy 4

| Fiber (lb/yd$^3$)* | Large | Medium | Small | Hairline | Weighted Value | Percent of Control |
|---|---|---|---|---|---|---|
| 0 (Control) | 2 | 24 | 24 | 36 | 96 | 100 |
| 2.5 | 0 | 0 | 24 | 24 | 36 | 38 |
| 5 | 0 | 0 | 12 | 36 | 30 | 31 |
| 7.5 | 0 | 0 | 0 | 24 | 12 | 13 |
| 10 | 0 | 0 | 0 | 0 | 0 | 0 |

*lb/yd$^3$ = lb fiber/yd$^3$ mortar

TABLE 6

Alloy 5

| Fiber (lb/yd$^3$)* | Large | Medium | Small | Hairline | Weighted Value | Percent of Control |
|---|---|---|---|---|---|---|
| 0 (Control) | 6 | 24 | 52 | 18 | 127 | 100 |
| 2.5 | 0 | 18 | 56 | 12 | 98 | 77 |
| 5 | 0 | 0 | 0 | 24 | 12 | 9 |
| 7.5 | 0 | 0 | 0 | 0 | 0 | 0 |
| 10 | 0 | 0 | 0 | 0 | 0 | 0 |

*lb/yd$^3$ = lb fiber/yd$^3$ mortar

TABLE 7

Summary of Percent Crack Reduction

| Fiber (36 mm) | lb fiber/yd$^3$ mortar | Percent Reduction |
|---|---|---|
| Alloy 1 | 5 | 58 |
| Alloy 1 | 10 | 84 |
| Alloy 1 | 25 | 100 |
| Alloy 1 | 50 | 100 |
| Alloy 3 | 2.5 | 85 |
| Alloy 3 | 5 | 93 |
| Alloy 3 | 7.5 | 98 |

TABLE 7-continued

Summary of Percent Crack Reduction

| Fiber (36 mm) | lb fiber/yd³ mortar | Percent Reduction |
|---|---|---|
| Alloy 3 | 10 | 100 |
| Alloy 4 | 2.5 | 63 |
| Alloy 4 | 5 | 69 |
| Alloy 4 | 7.5 | 88 |
| Alloy 4 | 10 | 100 |
| Alloy 5 | 2.5 | 23 |
| Alloy 5 | 5 | 91 |
| Alloy 5 | 7.5 | 100 |
| Alloy 5 | 10 | 100 |

TABLE 8

Alloy 3

| Fiber (lb/yd³)* | Large | Medium | Small | Hairline | Weighted Value | Percent of Control |
|---|---|---|---|---|---|---|
| 0(Control) | — | — | 3 | 36 | 21 | 100 |
| 2.5 | — | — | — | 6 | 3 | 14 |
| 5 | — | — | — | — | 0 | 0 |
| 7.5 | — | — | — | — | 0 | 0 |
| 10 | — | — | — | — | 0 | 0 |

*lb/yd³ = lb fiber/yd³ concrete

TABLE 9

Alloy 4

| Fiber (lb/yd³)* | Large | Medium | Small | Hairline | Weighted Value | Percent of Control |
|---|---|---|---|---|---|---|
| 0(Control) | — | — | 2 | 40 | 22 | 100 |
| 2.5 | — | — | — | 8 | 4 | 18 |
| 5 | — | — | — | — | 0 | 0 |
| 7.5 | — | — | — | — | 0 | 0 |
| 10 | — | — | — | — | 0 | 0 |

*lb/yd³ = lb fiber/yd³ concrete

TABLE 10

Alloy 5

| Fiber (lb/yd³)* | Large | Medium | Small | Hairline | Weighted Value | Percent of Control |
|---|---|---|---|---|---|---|
| 0(Control) | — | — | 5 | 42 | 26 | 100 |
| 2.5 | — | — | — | 10 | 5 | 19 |
| 5 | — | — | — | — | 0 | 0 |
| 7.5 | — | — | — | — | 0 | 0 |
| 10 | — | — | — | — | 0 | 0 |

*lb/yd³ = lb fiber/yd³ concrete

TABLE 11

Summary of Percent Crack Reduction

| Fiber (36 mm) | lb fiber/yd³ concrete | Percent Reduction |
|---|---|---|
| Alloy 3 | 2.5 | 86 |
| Alloy 3 | 5 | 100 |
| Alloy 3 | 7.5 | 100 |
| Alloy 3 | 10 | 100 |
| Alloy 4 | 2.5 | 82 |
| Alloy 4 | 5 | 100 |

TABLE 11-continued

Summary of Percent Crack Reduction

| Fiber (36 mm) | lb fiber/yd³ concrete | Percent Reduction |
|---|---|---|
| Alloy 4 | 7.5 | 100 |
| Alloy 4 | 10 | 100 |
| Alloy 5 | 2.5 | 81 |
| Alloy 5 | 5 | 100 |
| Alloy 5 | 7.5 | 100 |
| Alloy 5 | 10 | 100 |

TABLE 12

Alloy 3 (18 mm)

| Fiber (lb/yd³)* | Large | Medium | Small | Hairline | Weighted Value | Percent of Control |
|---|---|---|---|---|---|---|
| 0(Control) | 2 | 10 | 30 | 40 | 76 | 100 |
| 2.5 | — | — | 26 | 50 | 51 | 67 |
| 5 | — | — | 22 | 44 | 44 | 58 |
| 7.5 | — | — | 20 | 40 | 40 | 53 |
| 10 | — | — | 10 | 60 | 40 | 53 |

*lb/yd³ = lb fiber/yd³ mortar

TABLE 13

Alloy 5 (18 mm)

| Fiber (lb/yd³)* | Large | Medium | Small | Hairline | Weighted Value | Percent of Control |
|---|---|---|---|---|---|---|
| 0(Control) | 2 | 20 | 60 | 18 | 115 | 100 |
| 2.5 | — | 21 | 57 | 12 | 105 | 91 |
| 5 | — | 20 | 40 | 10 | 85 | 74 |
| 7.5 | — | 20 | 38 | 8 | 82 | 71 |
| 10 | — | 0 | 24 | 12 | 30 | 26 |

*lb/yd³ = lb fiber/yd³ mortar

TABLE 14

Alloy 3 (18 mm)

| Fiber (lb/yd³)* | Large | Medium | Small | Hairline | Weighted Value | Percent of Control |
|---|---|---|---|---|---|---|
| 0(Control) | — | — | 24 | 36 | 42 | 100 |
| 2.5 | — | — | — | 24 | 12 | 29 |
| 5 | — | — | — | 10 | 5 | 12 |
| 7.5 | — | — | — | 8 | 4 | 10 |
| 10 | — | — | — | 6 | 3 | 7 |

*lb/yd³ = lb fiber/yd³ concrete

TABLE 15

Alloy 3 (18 mm)

| Fiber (lb/yd³)* | Large | Medium | Small | Hairline | Weighted Value | Percent of Control |
|---|---|---|---|---|---|---|
| 0(Control) | — | — | — | 40 | 20 | 100 |
| 2.5 | — | — | — | 30 | 15 | 75 |
| 5 | — | — | — | 24 | 12 | 60 |
| 7.5 | — | — | — | 20 | 10 | 50 |
| 10 | — | — | — | 16 | 8 | 40 |

*lb/yd³ = lb fiber/yd³ concrete

TABLE 16

Summary of Percent Crack Reduction (mortar)

| Fiber (18 mm) | lb fiber/yd$^3$ mortar | Percent Reduction |
|---|---|---|
| Alloy 3 | 2.5 | 33 |
| Alloy 3 | 5 | 42 |
| Alloy 3 | 7.5 | 47 |
| Alloy 3 | 10 | 47 |
| Alloy 5 | 2.5 | 9 |
| Alloy 5 | 5 | 26 |
| Alloy 5 | 7.5 | 29 |
| Alloy 5 | 10 | 74 |

TABLE 17

Summary of Percent Crack Reduction (concrete)

| Fiber (18 mm) | lb fiber/yd$^3$ concrete | Percent Reduction |
|---|---|---|
| Alloy 3 | 2.5 | 71 |
| Alloy 3 | 5 | 88 |
| Alloy 3 | 7.5 | 90 |
| Alloy 3 | 10 | 93 |
| Alloy 5 | 2.5 | 25 |
| Alloy 5 | 5 | 40 |
| Alloy 5 | 7.5 | 50 |
| Alloy 5 | 10 | 60 |

TABLE 18

Alloy 5 (0.7 inch (18 mm) length fiber)

| Fiber (lb/yd$^3$)* | Large | Medium | Small | Hairline | Weighted Value | Percent of Control |
|---|---|---|---|---|---|---|
| 0(Control) | 25 | 28 | 36 | 26 | 180 | 100 |
| 1 | 22 | 13 | 9 | 31 | 117 | 65 |
| 2.5 | 16 | 7 | 26 | 28 | 102 | 57 |
| 5 | 4 | 16 | 14 | 27 | 72 | 40 |
| 7.5 | 0 | 17 | 6 | 22 | 51 | 28 |

*lb/yd$^3$ = lb fiber/yd$^3$ mortar

TABLE 19

Alloy 5 (1.4 inch (36 mm) length fiber)

| Fiber (lb/yd$^3$)* | Large | Medium | Small | Hairline | Weighted Value | Percent of Control |
|---|---|---|---|---|---|---|
| 0(Control) | 21 | 70 | 13 | 22 | 227 | 100 |
| 1 | 16 | 30 | 31 | 18 | 148 | 65 |
| 2.5 | 14 | 27 | 12 | 24 | 120 | 53 |
| 5 | 12 | 16 | 9 | 12 | 83 | 37 |
| 7.5 | 0 | 14 | 12 | 6 | 43 | 19 |

*lb/yd$^3$ = lb fiber/yd$^3$ mortar

TABLE 20

Alloy 5 (2.1 inch (53 mm) length fiber)

| Fiber (lb/yd$^3$)* | Large | Medium | Small | Hairline | Weighted Value | Percent of Control |
|---|---|---|---|---|---|---|
| 0(Control) | 15 | 38 | 35 | 20 | 166 | 100 |
| 1 | 12 | 23 | 7 | 21 | 100 | 60 |
| 2.5 | 6 | 10 | 12 | 18 | 59 | 36 |
| 5 | 4 | 6 | 14 | 17 | 47 | 28 |
| 7.5 | 0 | 7 | 5 | 12 | 25 | 15 |

*lb/yd$^3$ = lb fiber/yd$^3$ mortar

TABLE 21

Summary of Percent Crack Reduction: Alloy 5 Fibers in Mortar

| Fiber | lb fiber/yd$^3$ mortar | Percent Reduction |
|---|---|---|
| Alloy 5 -- 0.7 Inch | 1 | 35 |
| Alloy 5 -- 0.7 Inch | 2.5 | 43 |
| Alloy 5 -- 0.7 Inch | 5 | 60 |
| Alloy 5 -- 0.7 Inch | 7.5 | 72 |
| Alloy 5 -- 1.4 Inch | 1 | 35 |
| Alloy 5 -- 1.4 Inch | 2.5 | 47 |
| Alloy 5 -- 1.4 Inch | 5 | 63 |
| Alloy 5 -- 1.4 Inch | 7.5 | 81 |
| Alloy 5 -- 2.1 Inch | 1 | 40 |
| Alloy 5 -- 2.1 Inch | 2.5 | 64 |
| Alloy 5 -- 2.1 Inch | 5 | 72 |
| Alloy 5 -- 2.1 Inch | 7.5 | 85 |

TABLE 22

Alloy 5 (0.7 inch (18 mm) length fiber)

| Fiber (lb/yd$^3$)* | Large | Medium | Small | Hairline | Weighted Value | Percent of Control |
|---|---|---|---|---|---|---|
| 0(Control) | 4 | 64 | 12 | 17 | 161 | 100 |
| 1 | 0 | 7 | 52 | 22 | 77 | 48 |
| 2.5 | 0 | 0 | 40 | 13 | 47 | 29 |
| 5 | 0 | 0 | 24 | 14 | 31 | 19 |
| 7.5 | 0 | 0 | 0 | 22 | 11 | 7 |

*lb/yd$^3$ = lb fiber/yd$^3$ concrete

TABLE 23

Alloy 5 (1.4 inch (36 mm) length fiber)

| Fiber (lb/yd$^3$)* | Large | Medium | Small | Hairline | Weighted Value | Percent of Control |
|---|---|---|---|---|---|---|
| 0(Control) | 2 | 70 | 23 | 42 | 190 | 100 |
| 1 | 0 | 3 | 41 | 16 | 55 | 29 |
| 2.5 | 0 | 0 | 15 | 20 | 25 | 13 |
| 5 | 0 | 0 | 0 | 10 | 5 | 3 |
| 7.5 | 0 | 0 | 0 | 0 | 0 | 0 |

*lb/yd$^3$ = lb fiber/yd$^3$ concrete

TABLE 24

Alloy 5 (2.1 inch (53 mm) length fiber)

| Fiber (lb/yd$^3$)* | Large | Medium | Small | Hairline | Weighted Value | Percent of Control |
|---|---|---|---|---|---|---|
| 0(Control) | 3 | 55 | 20 | 32 | 155 | 100 |
| 1 | 0 | 0 | 19 | 62 | 50 | 32 |
| 2.5 | 0 | 0 | 0 | 67 | 34 | 22 |
| 5 | 0 | 0 | 0 | 6 | 3 | 2 |
| 7.5 | 0 | 0 | 0 | 0 | 0 | 0 |

*lb/yd$^3$ = lb fiber/yd$^3$ concrete

TABLE 25

Summary of Percent Crack Reduction: Alloy 5 Fibers in Concrete

| Fiber | lb fiber/yd$^3$ concrete | Percent Reduction |
|---|---|---|
| Alloy 5 -- 0.7 Inch | 1 | 52 |
| Alloy 5 -- 0.7 Inch | 2.5 | 71 |
| Alloy 5 -- 0.7 Inch | 5 | 81 |

TABLE 25-continued

Summary of Percent Crack Reduction: Alloy 5 Fibers in Concrete

| Fiber | lb fiber/yd³ concrete | Percent Reduction |
|---|---|---|
| Alloy 5 -- 0.7 Inch | 7.5 | 93 |
| Alloy 5 -- 1.4 Inch | 1 | 71 |
| Alloy 5 -- 1.4 Inch | 2.5 | 87 |
| Alloy 5 -- 1.4 Inch | 5 | 97 |
| Alloy 5 -- 1.4 Inch | 7.5 | 100 |
| Alloy 5 -- 2.1 Inch | 1 | 68 |
| Alloy 5 -- 2.1 Inch | 2.5 | 78 |
| Alloy 5 -- 2.1 Inch | 5 | 98 |
| Alloy 5 -- 2.1 Inch | 7.5 | 100 |

Example 3

Control of Plastic Shrinkage Cracking with SEVA Fibers

The data in Tables 26, 27, 28, 29, and 36 summarize the results from a plastic shrinkage cracking study conducted on four commercial fibers produced by SEVA of France. The study is performed in the same manner as Example 1. The typical dimensions of the fibers are shown in Table 26 and their composition is given in Table 27. The compositions were determined by elemental analysis.

As in Example 1, after curing for 24. hours the lengths of the large, medium, small, and hairline cracks were measured. A weighted value was calculated by multiplying the length of the large cracks by 3, then multiplying the length of the medium, small, and hairline cracks by 2, 1 and 0.5, respectively. The sum of the four products is represented by the weighted value in each table. In each case the control becomes 100% and subsequent samples are compared on a percent basis to the control (Percent of Control). In this comparison a small percentage means there were few cracks.

In Table 32, the results are converted to Percent (Shrinkage Control) Reduction to compare the ability of each fiber, based on its concentration in the cement matrix, to prevent or control the formation of plastic shrinkage cracks.

TABLE 26

| Fiber | Length mm (in) | Width mm (in) | Thickness μm (in × 10⁻³) | # Fibers/lb |
|---|---|---|---|---|
| FF15E0 | 15 (0.59) | 1.0 (0.039) | 24 (0.94) | 175,000 |
| FF20E0 | 20 (0.79) | 1.0 (0.039) | 24 (0.94) | 125,000 |
| FF20L6 | 20 (0.79) | 1.6 (0.063) | 29 (1.14) | 68,200 |
| FF30L6 | 30 (1.18) | 1.6 (0.063) | 29 (1.14) | 45,450 |

Fiber numbers per pound (lb) are approximate.

TABLE 27

| Sample | Product | Formula (atomic %) | Fe:Cr | P:C |
|---|---|---|---|---|
| SEVA | FF15E0 | $Fe_{73}Cr_6V_{0.1}Ni_{0.1}Mn_{0.2}P_{11}C_9Si_1$ | 12:1 | 1.2:1 |
| SEVA | FF20E0 | $Fe_{72}Cr_6V_{0.1}Ni_{0.1}Mn_{0.2}P_{11}C_{10}Si_1$ | 12:1 | 1.1:1 |
| SEVA | FF20L6 | $Fe_{72}Cr_6V_{0.7}Ni_{0.3}Mn_{0.2}P_{10}C_9Si_1$ | 12:1 | 1.1:1 |
| SEVA | FF30L6 | $Fe_{72}Cr_6V_{0.7}Ni_{0.3}Mn_{0.2}P_{10}C_9Si_1$ | 12:1 | 1.1:1 |

TABLE 28

SEVA FF15E0 amorphous fiber

| Fiber (lb/yd³)* | Large | Medium | Small | Hairline | Weighted Value | Percent of Control |
|---|---|---|---|---|---|---|
| 0(Control) | 12 | 32 | 52 | 24 | 164 | 100 |
| 2.5 | 12 | 20 | 10 | 24 | 98 | 60 |
| 5 | 10 | 15 | 10 | 10 | 75 | 46 |
| 7.5 | 0 | 5 | 41 | 24 | 63 | 38 |
| 10 | 0 | 10 | 31 | 12 | 57 | 35 |

*lb/yd³ = lb fiber/yd³ mortar

TABLE 29

SEVA FF20E0 amorphous fiber

| Fiber (lb/yd³)* | Large | Medium | Small | Hairline | Weighted Value | Percent of Control |
|---|---|---|---|---|---|---|
| 0(Control) | 2 | 26 | 24 | 24 | 94 | 100 |
| 2.5 | 0 | 30 | 12 | 20 | 82 | 87 |
| 5 | 0 | 0 | 36 | 26 | 49 | 52 |
| 7.5 | 0 | 0 | 30 | 24 | 42 | 45 |
| 10 | 0 | 0 | 0 | 16 | 8 | 9 |

*lb/yd³ = lb fiber/yd³ mortar

TABLE 30

SEVA FF20L6 amorphous fiber

| Fiber (lb/yd³)* | Large | Medium | Small | Hairline | Weighted Value | Percent of Control |
|---|---|---|---|---|---|---|
| 0(Control) | 4 | 36 | 86 | 30 | 185 | 100 |
| 2.5 | 10 | 24 | 40 | 32 | 134 | 72 |
| 5 | 2 | 20 | 36 | 10 | 87 | 47 |
| 7.5 | 0 | 0 | 0 | 48 | 24 | 13 |
| 10 | 0 | 0 | 0 | 32 | 16 | 9 |

*lb/yd³ = lb fiber/yd³ mortar

TABLE 31

SEVA FF30L6 amorphous fiber

| Fiber (lb/yd³)* | Large | Medium | Small | Hairline | Weighted Value | Percent of Control |
|---|---|---|---|---|---|---|
| 0(Control) | 4 | 30 | 96 | 48 | 192 | 100 |
| 2.5 | 0 | 10 | 48 | 60 | 98 | 51 |
| 5 | 0 | 5 | 48 | 48 | 82 | 43 |
| 7.5 | 0 | 0 | 24 | 48 | 48 | 25 |
| 10 | 0 | 0 | 24 | 24 | 36 | 19 |

*lb/yd³ = lb fiber/yd³ mortar

TABLE 32

Summary of Percent Crack Reduction

| Fiber | lb fiber/yd³ mortar | Percent Reduction |
|---|---|---|
| SEVA FF15E0 | 2.5 | 40 |
| SEVA FF15E0 | 5 | 54 |
| SEVA FF15E0 | 7.5 | 62 |
| SEVA FF15E0 | 10 | 65 |
| SEVA FF20E0 | 2.5 | 13 |

TABLE 32-continued

Summary of Percent Crack Reduction

| Fiber | lb fiber/yd³ mortar | Percent Reduction |
|---|---|---|
| SEVA FF20E0 | 5 | 48 |
| SEVA FF20E0 | 7.5 | 55 |
| SEVA FF20E0 | 10 | 91 |
| SEVA FF20L6 | 2.5 | 28 |
| SEVA FF20L6 | 5 | 53 |
| SEVA FF20L6 | 7.5 | 87 |
| SEVA FF20L6 | 10 | 91 |
| SEVA FF30L6 | 2.5 | 49 |
| SEVA FF30L6 | 5 | 57 |
| SEVA FF30L6 | 7.5 | 75 |
| SEVA FF30L6 | 10 | 81 |

Example 4

Control of Plastic Shrinkage Cracking in the Presence of Agents that Accelerate the Rate of Cure This study was performed in the sane manner as Example 1. However, an agent, Euclid Accelguard accelerator, a nitrate salt, was added at 2% by weight of the cement to the mix design to accelerate the curing process and therefore the development of cracks. Comparison of the control samples in Tables 4, 5 and 6 with the control samples in Tables 33, 34 and 35 showed that the weighted value for each control was significantly higher in the latter cases (where the curing agent was used). These results were then converted to Percent Crack Reduction (Percent Reduction) given in Tables 36–38.

TABLE 33

Alloy 3 with Accelerator

| Fiber (lb/yd³)* | Large | Medium | Small | Hairline | Weighted Value | Percent of Control |
|---|---|---|---|---|---|---|
| 0(Control) | 6 | 30 | 52 | 36 | 148 | 100 |
| 2.5 | 2 | 24 | 36 | 20 | 100 | 68 |
| 5 | 0 | 0 | 12 | 24 | 24 | 16 |
| 7.5 | 0 | 0 | 0 | 24 | 12 | 8 |
| 10 | 0 | 0 | 0 | 10 | 5 | 3 |

*lb/yd³ = lb fiber/yd³ mortar

TABLE 34

Alloy 4 with Accelerator

| Fiber (lb/yd³)* | Large | Medium | Small | Hairline | Weighted Value | Percent of Control |
|---|---|---|---|---|---|---|
| 0(Control) | 6 | 36 | 48 | 48 | 162 | 100 |
| 2.5 | 0 | 48 | 36 | 48 | 156 | 96 |
| 5 | 0 | 0 | 36 | 36 | 54 | 33 |
| 7.5 | 0 | 0 | 24 | 36 | 42 | 26 |
| 10 | 0 | 0 | 0 | 36 | 18 | 11 |

*lb/yd³ = lb fiber/yd³ mortar

TABLE 35

Percent Crack Reduction - Alloy 5 with Accelerator

| Fiber (lb/yd³)* | Large | Medium | Small | Hairline | Weighted Value | Percent of Control |
|---|---|---|---|---|---|---|
| 0(Control) | 24 | 48 | 65 | 60 | 263 | 100 |
| 2.5 | 0 | 24 | 60 | 90 | 153 | 58 |
| 5 | 0 | 0 | 72 | 60 | 102 | 39 |
| 7.5 | 0 | 0 | 0 | 65 | 32.5 | 12 |
| 10 | 0 | 0 | 0 | 30 | 15 | 6 |

*lb/yd³ = lb fiber/yd³ mortar

TABLE 36

Percent Crack Reduction

| Fiber | lb fiber/yd³ mortar | Percent Reduction |
|---|---|---|
| Alloy 3 with accelerator | 2.5 | 32 |
| Alloy 3 with accelerator | 5 | 84 |
| Alloy 3 with accelerator | 7.5 | 92 |
| Alloy 3 with accelerator | 10 | 97 |

TABLE 37

Percent Crack Reduction

| Fiber | lb fiber/yd³ mortar | Percent Reduction |
|---|---|---|
| Alloy 4 with accelerator | 2.5 | 4 |
| Alloy 4 with accelerator | 5 | 67 |
| Alloy 4 with accelerator | 7.5 | 74 |
| Alloy 4 with accelerator | 10 | 89 |

TABLE 38

Percent Crack Reduction

| Fiber | lb fiber/yd³ mortar | Percent Reduction |
|---|---|---|
| Alloy 5 with accelerator | 2.5 | 42 |
| Alloy 5 with accelerator | 5 | 61 |
| Alloy 5 with accelerator | 7.5 | 88 |
| Alloy 5 with accelerator | 10 | 94 |

Example 5

Corrosion Resistance

Eleven samples were evaluated in a corrosion study. Five samples were alloys 1–5 above, two samples were from SEVA, and four domestic fiber samples were also included (two mild steel and two stainless steel (SS)). Samples were evaluated for 48 hours in 0.1 N HCl, 0.4 N $FeCl_3$, 0.5% HCl/1.0% $FeCl_3$, and 5.0% $H_2SO_4$/10% NaCl/1% $FeCl_3$.

The amorphous fibers were superior to the domestic fibers samples mentioned above. The data are summarized in Table 39, mpy is mils per year.

TABLE 39

Average Corrosion Rates (mpy) of Various Materials in Corrosive Environments.
(Test Temperature: 30° C.; Test Time 48 Hours)

| Sample | 0.1 N HCl | 0.4 N FeCl$_3$ | 0.5% HCl + 1.0% FeCl$_3$ | 5.0% H$_2$SO$_4$ 10% NaCl 1% FeCl$_3$ |
|---|---|---|---|---|
| Alloy 1 | 3 | 1 | 2 | dissolved |
| Alloy 2 | 0 | 0 | 0 | 51 |
| Alloy 3 | 0.5 | 2 | 0 | 0 |
| Alloy 4 | 0 | 0 | 0 | 1 |
| Alloy 5 | 1 | 0 | 2 | 0 |
| SEVA FF 20E0 | 0 | 0 | 0 | 0 |
| SEVA FF 20L6 | 2 | 0 | 1 | 0 |
| Mild Steel 1 | 98 | dissolved | 272 | 204 |
| Mild Steel 2 | 282 | 767 | 222 | 337 |
| SS 304 | 0 | 101 | 117 | 130 |
| SS 430 | dissolved | dissolved | 19 | dissolved |

What is claimed is:

1. An alloy comprising an amorphous ferrophosphorus alloy of the formula:

$$Fe_a Cr_b M_c P_d C_e Si_f \quad \text{(Formula I)}$$

wherein M is a metal selected from the group consisting of V$_g$, Ni$_h$, Mn$_i$ and mixtures thereof, and a is about 66–76, b is about 1–10, c is about 2–7, d about 12–20, e about 1–6, f is less than about 2, g is about 1–5, h is less than about 2 and i is less than about 2, atomic percent; and wherein the ratio of metals to non-metals is sufficient to allow for the formation of a stable amorphous ferrophosphorus alloy.

2. The alloy of claim 1 having a non-uniform gross morphology.

3. The alloy of claim 1 or 2 wherein a is about 68–74, b is about 2–8, c is about 2–4, d is about 13–20, e is about 1–6, f is less than about 2, g is about 1–3, h is less than about 1 and i is less than 1.

4. The alloy of claim 1 wherein the phosphorus to chromium ratio is greater than 1.2 to 1, the iron to chromium ratio is greater than 12:1 and the chromium to vanadium ratio is less than 7:1.

5. The alloy of claim 1 or 2 wherein the alloy is in the form of a wire, ribbon or fiber and a pound of the alloy contains at least about 25,000 fibers.

6. The alloy of claim 5 wherein a pound of the alloy contains at least about 100,000 fibers having a length of about 18–55 mm.

7. The alloy of claim 5 wherein a pound of the alloy contains at least about 75,000 fibers having a length of greater than about 25 mm.

8. The alloy of claim 1 or 2 selected from the group consisting of: Fe$_{74}$Cr$_2$V$_2$Ni$_{0.5}$P$_{19}$C$_1$Si$_{0.5}$; Fe$_{72}$Cr$_2$V$_2$Ni$_{0.5}$P$_{17}$C$_5$Si$_1$; Fe$_{71}$Cr$_6$V$_2$Ni$_{0.5}$Mn$_{0.5}$P$_{18}$C$_1$Si$_1$; Fe$_{68}$Cr$_5$V$_2$Ni$_{0.5}$Mn$_{0.5}$P$_{16}$C$_{5.5}$Si$_1$; and Fe$_{71}$Cr$_5$V$_2$Ni$_{0.5}$Mn$_{0.5}$P$_{15}$C$_5$Si$_1$.

9. The alloy of claim 8 selected from the group consisting of: Fe$_{71}$Cr$_6$V$_2$Ni$_{0.5}$Mn$_{0.5}$P$_{18}$C$_1$Si$_1$; Fe$_{68}$Cr$_5$V$_2$Ni$_{0.5}$Mn$_{0.5}$P$_{16}$C$_{5.5}$Si$_1$; and Fe$_{71}$Cr$_5$V$_2$Ni$_{0.5}$Mn$_{0.5}$P$_{15}$C$_5$Si$_1$.

10. The alloy of claim 9 selected from the group consisting of: Fe$_{71}$Cr$_6$V$_2$Ni$_{0.5}$Mn$_{0.5}$P$_{18}$C$_1$Si$_1$; and Fe$_{71}$Cr$_5$V$_2$Ni$_{0.5}$Mn$_{0.5}$P$_{15}$C$_5$Si$_1$.

11. An alloy comprising an amorphous ferrophosphorus alloy of the formula:

$$Fe_a Cr_b M_c P_d C_e Si_f \quad \text{(Formula II)}$$

 

wherein M is a metal selected from the group consisting of V$_g$, Ni$_h$, Mn$_i$ and mixtures thereof, and a is about 61–87, b is about 1–10, c is about 1–5, d is about 4–20, e is about 1–16, f is less than about 3.5, g is about 0.1 to about 5, h is less than about 1 and i is less than about 1, atomic percent; and wherein the ratio of metals to non-metals is sufficient to allow for the formation of a stable amorphous ferrophosphorus alloy and the alloy is useful in control of shrinkage cracks in cement composites.

12. The alloy of claim 11 having a non-uniform gross morphology and the alloy is useful as a shrinkage control agent to control shrinkage cracks in cement composites.

13. The alloy of claim 11 or 12 wherein a is about 66–76, b is about 1–10, c is about 2–5, d is about 12–20, e is about 1–6, f is less than about 2, g is about 1–5, h is less than about 1 and i is less than about 1, atomic percent and the alloy is used in the control of shrinkage cracks in cement composites.

14. The alloy of claim 13 wherein a is about 68–74, b is about 2–8, c is about 2–4, d is about 13–20, e is about 1–6, f is less than about 2, g is about 1–3, h is less than about 1 and i is less than 1.

15. The alloy of claim 14 selected from the group consisting of: Fe$_{74}$Cr$_2$V$_2$Ni$_{0.5}$P$_{19}$C$_1$Si$_{0.5}$; Fe$_{72}$Cr$_2$V$_2$Ni$_{0.5}$P$_{17}$C$_5$Si$_1$; Fe$_{71}$Cr$_6$V$_2$Ni$_{0.5}$Mn$_{0.5}$P$_{18}$C$_1$Si$_1$; Fe$_{68}$Cr$_5$V$_2$Ni$_{0.5}$Mn$_{0.5}$P$_{16}$C$_{5.5}$Si$_1$; and Fe$_{71}$Cr$_5$V$_2$Ni$_{0.5}$Mn$_{0.5}$P$_{15}$C$_5$Si$_1$.

16. The alloy of claim 15 selected from the group consisting of: Fe$_{71}$Cr$_6$V$_2$Ni$_{0.5}$Mn$_{0.5}$P$_{18}$C$_1$Si$_1$; Fe$_{68}$Cr$_5$V$_2$Ni$_{0.5}$Mn$_{0.5}$P$_{16}$C$_{5.5}$Si$_1$; and Fe$_{71}$Cr$_5$V$_2$Ni$_{0.5}$Mn$_{0.5}$P$_{15}$C$_5$Si$_1$.

17. The alloy of claim 16 selected from the group consisting of: Fe$_{71}$Cr$_6$V$_2$Ni$_{0.5}$Mn$_{0.5}$P$_{18}$C$_1$Si$_1$; and Fe$_{71}$Cr$_5$V$_2$Ni$_{0.5}$Mn$_{0.5}$P$_{15}$C$_5$Si$_1$.

18. The alloy of claim 13 wherein the iron to chromium ratio is greater than 12:1 and the chromium to vanadium ratio is less than 7:1.

19. The alloy of claim 18 wherein a is about 68–74, b is about 2–8, c is about 2–4, d is about 13–20, e is about 1–6, f is less than about 2, g is about 1–3, h is less than about 1 and i is less than 1.

20. A cement composite comprising the alloy of claim 19 as a shrinkage control agent in an amount of from about 0.25–10 pounds per cubic yard of said cement.

21. A cement composite comprising the alloy of claim 20 as a shrinkage control agent in an amount of from about 0.5–5 pounds per cubic yard of said cement composite.

22. The cement composite of claim 21 wherein the alloy has a non-uniform gross morphology.

23. A cement composite comprising the alloy of claim 13 as a shrinkage control agent in an amount of from about 0.25–20 pounds per cubic yard of said cement composite.

24. The alloy of claim 11 or 12 wherein the alloy is in the form of a wire, ribbon or fiber and a pound of the alloy contains at least about 25,000 fibers.

25. The alloy of claim 24 wherein a pound of the alloy contains at least about 100,000 fibers.

26. The alloy of claim 25 wherein the alloy a pound of the alloy contains at least about 75,000 fibers having a length greater than about 25 mm.

27. A cement composite comprising the alloy of claim 11 or 12 as a shrinkage control agent in an amount of from about 0.25–40 pounds per cubic yard of said cement composite.

28. A cement composite comprising cement, sand, an aggregate and a shrinkage crack control agent which is an amorphous ferrophophorus alloy of the formula:

$$Fe_a Cr_b M_c P_d C_e Si_f$$

wherein M is a metal selected from the group consisting of V$_g$, Ni$_h$, Mn$_i$ and mixtures thereof, and a is about 61–87, b is about 1–10, c is about 1–5, d is about 4–20, e is about 1–16, f is less than about 3.5, g is about 0.2 to about 5, h is less than about 1 and i is less than about 1, atomic percent; and wherein the ratio of metals to non-metals is sufficient to allow for the formation of a stable amorphous ferrophosphorus alloy.

29. The cement composite of claim 28 wherein said alloy has a non-uniform gross morphology.

30. The cement composite of claim 29 wherein a is about 68–74, b is about 2–8, c is about 2–4, d is about 13–20, e is about 1–6, f is less than about 2, g is about 1–3, h is less than about 1 and i is less than 1 and the phosphorus to chromium ratio is greater than 1.2 to 1, the iron to chromium ratio is greater than 12:1 and the chromium to vanadium ratio is less than 7:1.

31. The cement composite of claim 30 which contains said shrinkage crack control agent in an amount of from about 0.25–20 pounds per cubic yard of cement composite.

32. The cement composite of claim 31 which contains said the shrinkage crack control agent in an amount of from about 0.25 to about 10 pounds per cubic yard of cement composite.

33. A process for controlling the formation of shrinkage cracks in cementitious material comprising adding an alloy of the formula:

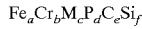

$Fe_aCr_bM_cP_dC_eSi_f$ to cement wherein M is a metal selected from the group consisting of $V_g$, $Ni_h$, $Mn_i$ and mixtures thereof, and a is about 61–87, b is about 1–10, c is about 1–5, d is about 4–20, e is about 1–16, f is less than about 3.5, g is about 0.2 to about 5, h is less than about 1 and i is less than about 1, atomic percent; and wherein the ratio of metals to non-metals is sufficient to allow for the formation of a stable amorphous ferrophosphorus alloy.

34. The process of claim 33 wherein the alloy has a non-uniform gross morphology.

35. The process of claim 34 wherein a is about 68–74, b is about 2–8, c is about 2–4, d is about 13–20, e is about 1–6, f is less than about 2, g is about 1–3, h is less than about 1 and i is less than 1 and the phosphorus to chromium ratio is greater than 1.2 to 1, the iron to chromium ratio is greater than 12:1 and the chromium to vanadium ratio is less than 7:1.

36. The process of claim 35 comprising adding the alloy in an amount of from about 0.25–20 pounds per cubic yard of cement composite.

37. The process of claim 36 comprising adding the alloy in an amount of from about 0.25 to about 10 pounds per cubic yard of cement composite.

* * * * *

UNITED STATES PATENT AND TRADEMARK OFFICE
CERTIFICATE OF CORRECTION

PATENT NO. : 6,197,106 B1
DATED : March 6, 2001
INVENTOR(S) : Tieckelmann et al.

Page 1 of 1

It is certified that error appears in the above-identified patent and that said Letters Patent is hereby corrected as shown below:

Column 1,
Line 33, replace the word "waiter" with -- water --.

Column 2,
Line 25 thereof, please delete the ";" after the term "curing".

Column 6,
Line 1 thereof, please delete the "m" after the word "a".

Column 8,
Line 58 thereof, please replace the number "35.5" with -- 35.6 --.

Column 15,
Line 31 thereof, please delete the "." after the number "24".

Column 17,
Line 31, please replace the word "sane" with the word -- same --.

Signed and Sealed this

Eighth Day of January, 2002

Attest:

JAMES E. ROGAN
*Attesting Officer*   *Director of the United States Patent and Trademark Office*